United States Patent
Kumar Sethy

(10) Patent No.: US 10,877,957 B2
(45) Date of Patent: Dec. 29, 2020

(54) METHOD AND DEVICE FOR DATA VALIDATION USING PREDICTIVE MODELING

(71) Applicant: WIPRO LIMITED, Bangalore (IN)

(72) Inventor: Sarat Kumar Sethy, Bhubaneswar (IN)

(73) Assignee: Wipro Limited, Bangalore (IN)

(*) Notice: Subject to any disclaimer, the term of this patent is extended or adjusted under 35 U.S.C. 154(b) by 174 days.

(21) Appl. No.: 16/111,253

(22) Filed: Aug. 24, 2018

(65) Prior Publication Data
US 2020/0004857 A1 Jan. 2, 2020

(30) Foreign Application Priority Data
Jun. 29, 2018 (IN) .............................. 201841024380

(51) Int. Cl.
G06F 16/23 (2019.01)
G06N 5/04 (2006.01)
G06N 20/00 (2019.01)

(52) U.S. Cl.
CPC ........... *G06F 16/2365* (2019.01); *G06N 5/04* (2013.01); *G06N 20/00* (2019.01)

(58) Field of Classification Search
CPC .. G06F 16/2365; G06F 16/176; G06F 16/288; G06F 16/1734; G06F 16/9024; G06N 20/00; G06N 5/04
USPC ...................................................... 707/690
See application file for complete search history.

(56) References Cited

U.S. PATENT DOCUMENTS

| | | | |
|---|---|---|---|
| 6,973,459 B1 * | 12/2005 | Yarmus | G06F 16/24544 707/778 |
| 6,981,040 B1 * | 12/2005 | Konig | H04L 67/20 |
| 7,962,483 B1 * | 6/2011 | Thomas | G06N 5/025 707/736 |
| 2008/0133434 A1 * | 6/2008 | Asar | G06N 20/00 706/12 |
| 2010/0205123 A1 * | 8/2010 | Sculley | G06F 21/562 706/12 |
| 2012/0023046 A1 * | 1/2012 | Verma | G06Q 30/02 706/12 |
| 2012/0191631 A1 * | 7/2012 | Breckenridge | G06N 20/00 706/12 |
| 2017/0244737 A1 * | 8/2017 | Kuperman | H04L 63/1425 |
| 2018/0060594 A1 | 3/2018 | Adler et al. | |
| 2018/0165554 A1 * | 6/2018 | Zhang | G06K 9/6269 |

FOREIGN PATENT DOCUMENTS

CN 103268460 A 8/2013

* cited by examiner

*Primary Examiner* — Evan Aspinwall
(74) *Attorney, Agent, or Firm* — Finnegan, Henderson, Farabow, Garrett & Dunner, LLP

(57) ABSTRACT

A method of validating data for a target application is disclosed. The method includes receiving an input data from at least one resource, such that the input data comprises at least one of structured data and unstructured data. The method further includes validating the input data based on a predictive AI model to generate validated data. The method further includes evaluating the validated data based on a predefined criteria associated with the target application. The method further includes implementing incremental learning for the predictive artificial intelligence (AI) model based on the evaluating.

15 Claims, 9 Drawing Sheets

| Subject Area | Source File | Source Field | Mapping Rule | Target Table (Document DB) | Target Field | Target Data Type | Null |
|---|---|---|---|---|---|---|---|
| PARTY | FINANCIAL_SERVICES_ROLE_SA.dat<br>FINANCIAL_SERVICES_ROLE_SA.dat<br>FINANCIAL_SERVICES_ROLE_SA.dat<br>CHANNEL_ROLE<br>CHANNEL_ROLE<br>CHANNEL_ROLE<br>CHANNEL_ROLE<br>EXTERNAL_ORGANISATION<br>EXTERNAL_ORGANISATION<br>EXTERNAL_ORGANISATION<br>EXTERNAL_ORGANISATION<br>INTERNAL_ORGANISATION<br>INTERNAL_ORGANISATION<br>INTERNAL_ORGANISATION<br>INTERNAL_ORGANISATION<br>PERSON<br>PERSON<br>PERSON<br>PERSON | PT_FS_ROLE_PLAYER_EXTERNAL_REFERENCE_TEXT<br>PT_FS_ROLE_PLAYER_TYPE_ID<br>PT_FS_EXTERNAL_SOURCE_CODE_ID<br>EXTERNAL_REFERENCE_TEXT<br>ROLE_PLAYER_ID_TYPE_ID<br>EXTERNAL_SOURCE_CODE_ID<br>EXTERNAL_REFERENCE_TEXT<br>ROLE_PLAYER_ID_TYPE_ID<br>EXTERNAL_SOURCE_CODE_ID<br>EXTERNAL_REFERENCE_TEXT<br>ROLE_PLAYER_ID_TYPE_ID<br>EXTERNAL_SOURCE_CODE_ID | Get Anchor ID from ROLE_PLAYER for <PT_FS_ROLE_PLAYER_EXTERNAL_REFERENCE_TEXT, PT_FS_ROLE_PLAYER_TYPE_ID, PT_FS_EXTERNAL_SOURCE_CODE_ID><br>Select<br>B.ROLE_PLAYER_ID,<br>FROM<br>FINANCIAL_SERVICES_ROLE_SA.dat A,<br>(Select<br>ROLE_PLAYER_ID,<br>EXTERNAL_REFERENCE_TEXT,<br>TYPE_ID,<br>EXTERNAL_SOURCE_CODE_ID<br>FROM<br>CHANNEL_ROLE<br>UNION<br>Select<br>ROLE_PLAYER_ID,<br>EXTERNAL_REFERENCE_TEXT,<br>TYPE_ID,<br>EXTERNAL_SOURCE_CODE_ID<br>FROM<br>EXTERNAL_ORGANISATION<br>UNION<br>Select<br>ROLE_PLAYER_ID,<br>EXTERNAL_REFERENCE_TEXT,<br>TYPE_ID,<br>EXTERNAL_SOURCE_CODE_ID<br>FROM<br>INTERNAL_ORGANISATION<br>UNION<br>Select<br>ROLE_PLAYER_ID,<br>EXTERNAL_REFERENCE_TEXT,<br>TYPE_ID,<br>EXTERNAL_SOURCE_CODE_ID<br>FROM<br>PERSON<br>) B<br>where<br>B.EXTERNAL_REFERENCE_TEXT=A.PT_FS_ROLE_PLAYER_EXTERNAL_REFERENCE_TEXT<br>and<br>B.TYPE_ID=A.PT_FS_ROLE_PLAYER_TYPE_ID<br>And<br>A.PT_FS_EXTERNAL_SOURCE_CODE_ID=B.EXTERNAL_SOURCE_CODE_ID | FINANCIAL_SERVICES_ROLE | ROLE_PLAYER_ID | INTEGER | N |

FIG. 3

| Column 404 | Column 406 | Column 408 | Column 410 | Column 412 | Column 414 |
|---|---|---|---|---|---|
| PARTY | FINANCIAL_SERVICES_ROLE_SA.dat<br>FINANCIAL_SERVICES_ROLE_SA.dat<br>FINANCIAL_SERVICES_ROLE_SA.dat<br><br>CHANNEL_ROLE<br>CHANNEL_ROLE<br>CHANNEL_ROLE<br>CHANNEL_ROLE<br><br>EXTERNAL_ORGANISATION<br>EXTERNAL_ORGANISATION<br>EXTERNAL_ORGANISATION<br>EXTERNAL_ORGANISATION<br><br>INTERNAL_ORGANISATION<br>INTERNAL_ORGANISATION<br>INTERNAL_ORGANISATION<br>INTERNAL_ORGANISATION<br><br>PERSON<br>PERSON<br>PERSON<br>PERSON | PT_FS_ROLE_PLAYER_EXTERNAL_REFERENCE_TEXT<br>PT_FS_ROLE_PLAYER_TYPE_ID<br>PT_FS_EXTERNAL_SOURCE_CODE_ID<br><br>EXTERNAL_REFERENCE_TEXT<br>ROLE_PLAYER_ID<br>TYPE_ID<br>EXTERNAL_SOURCE_CODE_ID<br><br>EXTERNAL_REFERENCE_TEXT<br>ROLE_PLAYER_ID<br>TYPE_ID<br>EXTERNAL_SOURCE_CODE_ID<br><br>EXTERNAL_REFERENCE_TEXT<br>ROLE_PLAYER_ID<br>TYPE_ID<br>EXTERNAL_SOURCE_CODE_ID<br><br>EXTERNAL_REFERENCE_TEXT<br>ROLE_PLAYER_ID<br>TYPE_ID<br>EXTERNAL_SOURCE_CODE_ID | Get Anchor ID from ROLE_PLAYER for<br><PT_FS_ROLE_PLAYER_EXTERNAL_REFERENCE_TEXT,PT_FS_ROLE_PLAYER_TYPE_ID,PT_FS_EXTERNAL_SOURCE_CODE_ID><br><br>Select<br>B.ROLE_PLAYER_ID<br>FROM<br>FINANCIAL_SERVICES_ROLE_SA.dat A,<br>(Select<br>ROLE_PLAYER_ID,<br>EXTERNAL_REFERENCE_TEXT,<br>TYPE_ID,<br>EXTERNAL_SOURCE_CODE_ID<br>FROM<br>CHANNEL_ROLE<br><br>UNION<br><br>Select<br>ROLE_PLAYER_ID,<br>EXTERNAL_REFERENCE_TEXT,<br>TYPE_ID,<br>EXTERNAL_SOURCE_CODE_ID<br>FROM<br>EXTERNAL_ORGANISATION<br><br>UNION<br><br>Select<br>ROLE_PLAYER_ID,<br>EXTERNAL_REFERENCE_TEXT,<br>TYPE_ID,<br>EXTERNAL_SOURCE_CODE_ID<br>FROM<br>INTERNAL_ORGANISATION<br><br>UNION<br><br>Select<br>ROLE_PLAYER_ID,<br>EXTERNAL_REFERENCE_TEXT,<br>TYPE_ID,<br>EXTERNAL_SOURCE_CODE_ID<br>FROM<br>PERSON<br>) B<br>Where<br><br>B.EXTERNAL_REFERENCE_TEXT=A.PT_FS_ROLE_PLAYER_EXTERNAL_REFERENCE_TEXT and<br><br>B.TYPE_ID=A.PT_FS_ROLE_PLAYER_TYPE_ID<br>And<br><br>A.PT_FS_EXTERNAL_SOURCE_CODE_ID=B.EXTERNAL_SOURCE_CODE_ID | FINANCIAL_SERVICES_ROLE | ROLE_PLAYER_ID |

FIG. 4

| Column 504 | Column 506 | Column 508 | Column 510 | Column 512 | Column 514 | Column 516 |
|---|---|---|---|---|---|---|
| SRC_XXX_EXTRACT.dat | ACCIDENT_YEAR_NUMBER | INTEGER | Valid Yr | Acc | ACCXXX_SA.dat | AC_AE_ACCIDENT_YEAR_NUMBER |
| SRC_XXX_EXTRACT.dat | ACCOUNTING_PERIOD_EXTERNAL_REFERENCE_TEXT | VARCHAR(256) | | Acc | ACCXXX_SA.dat | AC_AE_ACCOUNTING_PERIOD_ID |
| SRC_XXX_EXTRACT.dat | SPREAD_LOSS_XXX_AMOUNT | DECIMAL(14,2) | | Acc | ACCXXX_SA.dat | AC_AE_AMOUNT |
| SRC_XXX_EXTRACT.dat | COMMUTATION_FLAG | BIT | IF COMMUTATION_FLAG IS NULL THEN 0 Else COMMUTATION_FLAG End If | Acc | ACCXXX_SA.dat | AC_AE_COMMUTATION_FLAG |
| SRC_XXX_EXTRACT.dat | DIRECT_ASSUMED_CEDED_CODE | VARCHAR(20) | Select CODE_ID FROM CODE Where CODE_VALUE_STRING=DIRECT_ASSUMED_CEDED_CODE And CODE_SCHEME_NAME='Direct_Assumed_Ceded' | Acc | ACCXXX_SA.dat | AC_AE_DIRECT_ASSUMED_CEDED_CODE_ID |
| SRC_XXX_EXTRACT.dat | | | VALID Date | Acc | ACCXXX_SA.dat | AC_AE_EFFECTIVE_FROM_DATE |
| SRC_XXX_EXTRACT.dat | ACCOUNT_EFFECTIVE_TO_DATE | DATETIME | VALID Date | Acc | ACCXXX_SA.dat | AC_AE_EFFECTIVE_TO_DATE |
| Cyyy Cyyy Cyyy | CODE_ID CODE_SCHEME_NAME CODE_VALUE_STRING ORIGINATING_SYSTEM_ID | INTEGER VARCHAR(20) VARCHAR(20) VARCHAR(20) | Select CODE_ID From CODE Where CODE_SCHEME_NAME = "Detailed_Originating_System" And CODE_VALUE_STRING = '16' | Acc | ACCXXX_SA.dat | AC_AE_EXTERNAL_SOURCE_CODE_ID |

FIG. 5

| Source Data (802) | Validated Data (804) |
|---|---|
| Null | 1/1/1900, 01/01/1900 |
| Space | 1/1/1900, 01/01/1900 |
| 20/201/1 | 01/20/2010, 01/20/201 |
| 20/20 1/1 | 01/20/2001, 01/20/2010 |
| 20/20-1/1 | 01/20/2001, 01/20/2010 |

METHOD AND DEVICE FOR DATA VALIDATION USING PREDICTIVE MODELING

TECHNICAL FIELD

This disclosure relates generally to data validation, and more particularly to a method and device for data validation using predictive modeling for a target application.

BACKGROUND

Various types of data may be required for different applications. However, the available data may suffer from various abnormalities and, hence, may not be suitable for use at target applications. For example, the available data may be corrupted, unformatted, or include errors. These abnormalities may lead to disrupting of operations performed using such data. Further, applications performed using such data may return incorrect results. Some applications, such as data warehouse applications which involve advanced operations performed using data, may be severely hit due to abnormalities of the data. Therefore, it becomes essential to protect data integrity.

In order to maintain data integrity, it may be important to extract the data properly from various data sources. The extracted data may further require cleaning, formalizing and validating so as to make it suitable for using and reducing chances of errors during use at the target applications. Validating the data may involve testing the data to determine if the (extracted, cleaned and formalized) data adheres to its representation in the application as expected. However, the testing of the data involves manual intervention which is both time intensive and effort intensive.

Some techniques are known in the art for performing verification and validation for structured or unstructured types of data on cloud storage or on premises storage. Further, some techniques provide for validation and verification of data anomalies using artificial intelligence (AI) techniques. These techniques may further be based on rules governing business between data sources. However, the known techniques are effective for only limited types of data, and may not be effective for data derived from various different types of sources.

SUMMARY

In one embodiment, a method for validating data for a target application is disclosed. In one embodiment, the method may include receiving an input data from at least one resource, such that the input data comprises at least one of structured data and unstructured data. The method may further include validating the input data based on a predictive artificial intelligence (AI) model to generate validated data. The method may further include evaluating the validated data based on a predefined criteria associated with the target application. The method may further include implementing incremental learning for the predictive AI model based on the evaluating.

In another embodiment, a data validating device for validating data for a target application is disclosed. The data validating device includes a processor and a memory communicatively coupled to the processor, wherein the memory stores processor instructions, which, on execution, causes the processor to receive an input data from at least one resource, wherein the input data comprises at least one of structured data and unstructured data. The processor instructions further cause the processor to validate the input data based on a predictive AI model to generate validated data. The processor instructions further cause the processor to evaluate the validated data based on a predefined criteria associated with the target application. The processor instructions further cause the processor to implement incremental learning for the predictive AI model based on the evaluating.

In yet another embodiment, a non-transitory computer-readable storage medium is disclosed. The non-transitory computer-readable storage medium has instructions stored thereon, a set of computer-executable instructions causing a computer comprising one or more processors to perform steps comprising receiving an input data from at least one resource, wherein the input data comprises at least one of structured data and unstructured data; validating the input data based on a predictive AI model to generate validated data; evaluating the validated data based on a predefined criteria associated with the target application; and implementing incremental learning for the predictive AI model based on the evaluating.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 illustrates a table that includes exemplary business logic and data governance rules, in accordance with an exemplary embodiment.

FIG. 4 illustrates a table that includes exemplary business logic and data governance rules, in accordance with another exemplary embodiment.

FIG. 5 illustrates a table that includes exemplary business logic and data governance rules, in accordance with yet another exemplary embodiment.

FIG. 8 illustrates an exemplary case for validating data for a target application, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
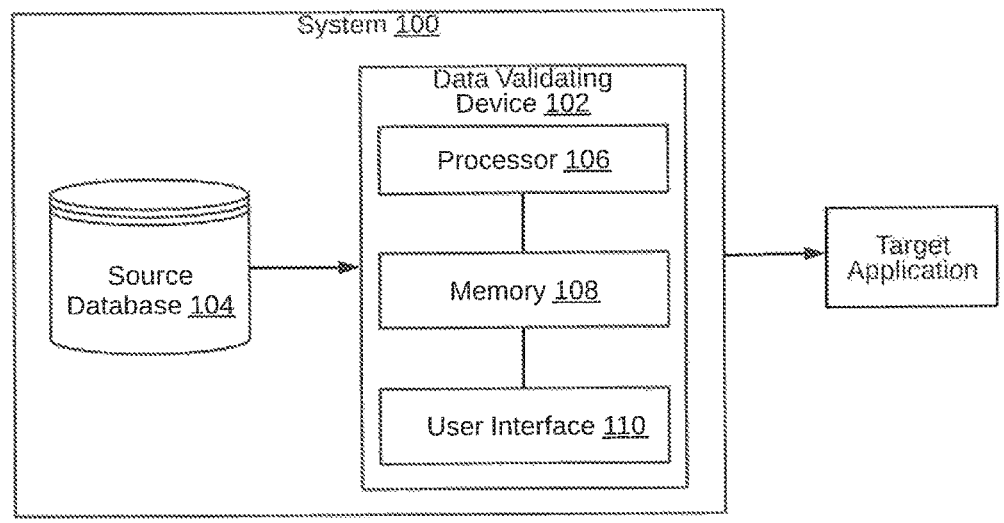
FIG. 1 is a block diagram illustrating a system for validating data for a target application, in accordance with an embodiment.

In one embodiment, a system 100 for validating data for a target application is illustrated in the FIG. 1, in accordance with an embodiment. The system 100 may include a data validating device 102 and a source database 104. The data validating device 102 may be a computing device that has document processing capability. Examples of the data validating device 102 may include, but are not limited to, server, desktop, laptop, notebook, netbook, tablet, smartphone, mobile phone, application server, sever, or the like.

The data validating device 102 may validate input data for a target application. By way of an example the applications may be related to banking, insurance or health sectors. In some embodiments, the input data may include one or more of structured data and unstructured data. The input data may be received from the source database 104. To this end, the data validating device 102 may be communicatively coupled to the source database 104. Further, in some embodiments, the data validating device 102 may be communicatively coupled to a system running a target application. The source database 104 may include various sources from which structured and unstructured data may be extracted. By way of an example, the source database 104 may include a Relational Database Management System (RDBMS) from which structured data may be extracted. By way of another example, the source database 104 may include website data, machine generated data, and word documents from which unstructured data may extracted.

As will be described in greater detail in conjunction with FIG. 2 to FIG. 10, once the data validating device 102 is trained, in order to validate data, the data validating device 102 may receive an input data from at least one resource. The data validating device 102 may further validate the input data based on a predictive Artificial Intelligence (AI) model to generate validated data. The data validating device 102 may further evaluate the validated data based on a predefined criteria associated with the target application. The data validating device 102 may further implement incremental learning for the predictive AI model based on the evaluating.

In order to perform the above discussed functionalities, the data validating device 102 may include a processor 106 and a memory 108. The memory 108 may store instructions that, when executed by the processor 106, cause the processor 106 to validate data as discussed in greater detail in FIG. 2 to FIG. 9. The memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

The memory 108 may also store various data (e.g., input data (structured data and unstructured data), target application data, predictive AI model data, predefined criteria data, validation data, evaluation data, formatting data, error data, machine learning data, inadequacy data, diagnostic data, etc.) that may be captured, processed, and/or required by the system 100.

The data validating device 102 may further include a user interface 110 through which the data validating device 102 may interact with a user and vice versa. By way of an example, the user interface 110 may be used to display results of analysis performed by the data validating device 102 to the user. By way of another example, the user interface 110 may be used by the user to provide inputs to the data validating device 102.

The system 100 may interact with one or more external devices (not shown in FIG. 1) over a communication network (not shown in FIG. 1) for sending or receiving various data. Examples of the one or more external devices may include, but are not limited to a remote server, a digital device, or another computing system. The communication network may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The external device may provide source of data to the system 100 that has to be validated for a target application.

Figure 2:
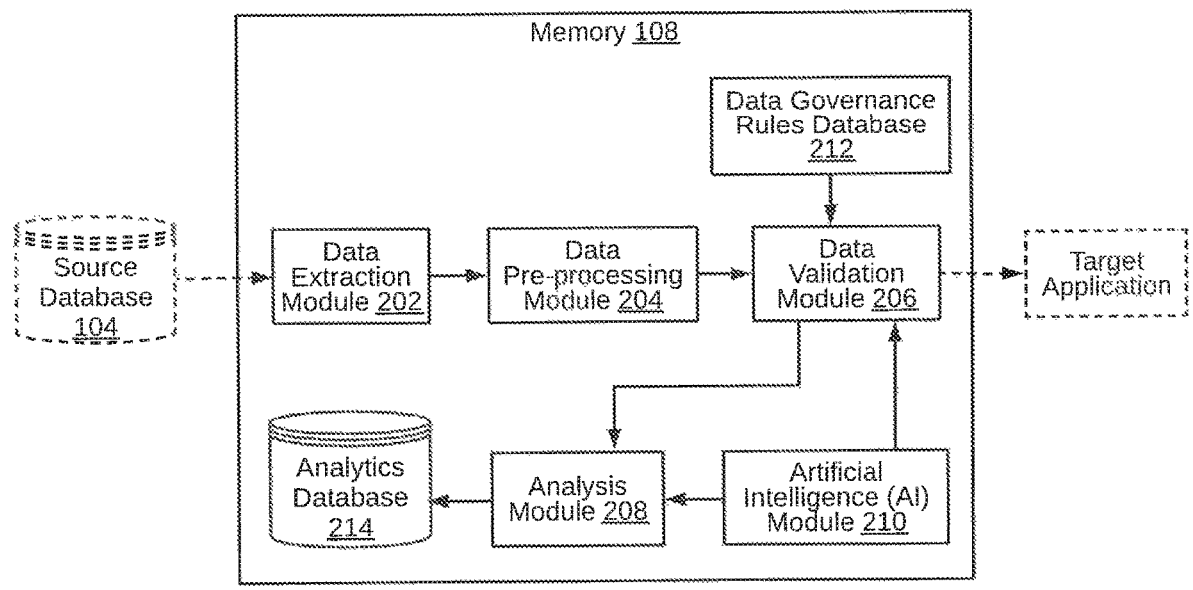
FIG. 2 illustrates a block diagram of a memory of a data validating device configured to validate data for a target application, in accordance with an embodiment.

Referring now to FIG. 2, a functional block diagram of the memory 108 within the data validating device 102 configured to validate data for a target application is illustrated in accordance with an embodiment. The memory 108 may include modules that may perform various functions so as to validate data for the target application. The memory 108 may include a data extraction module 202, a data pre-processing module 204, a data validation module 206, and an analysis module 208. Additionally, in some embodiments, the data validating device 102 may include an AI module 210, a data governance rules database 212, and an analytics database 214. As will be appreciated by those skilled in the art, all such aforementioned modules 202-214 may be represented as a single module or a combination of different modules. Moreover, as will be appreciated by those skilled in the art, each of the modules 202-214 may reside, in whole or in parts, on one device or multiple devices in communication with each other.

The data extraction module 202 may extract data from various resources (for example, the source database 104). As may be appreciated by those skilled in that art, the extracted data may be in structured format or unstructured format. In some embodiments, the structured data may include data extracted from a Relational Database Management System (RDBMS). In some embodiments, the unstructured data may include data extracted from a website, or data extracted from a word document. In some embodiments, the unstructured data may include machine generated data. As will be further appreciated, the data extracted from a website or word document is most likely to be found in unstructured format.

The data pre-processing module 204 may receive the data extracted from the data extraction module 202. Upon receiving the data, the data pre-processing module 204 may process the data so as to make the data suitable for further processing. In some embodiments, the data pre-processing module 204 may perform one or more pre-processing functions. By way of example, the pre-processing functions may include removing incorrect data, updating incorrect data, removing incomplete data, updating incomplete data, removing improperly formatted data, updating improperly formatted data or removing duplicated data from the input data.

The data validation module 206 may receive the pre-processed data from the data pre-processing module 204. As may be appreciated by those skilled in the art, the received pre-processed data may be formatted to some extent. However, the pre-processed data may still not be in a standard format to be suitable for further processing. In some embodiments, the data validation module 206, therefore, may first convert the received pre-processed data into a standard format. By way of an example, converting the input data into a standard format may include adjusting spacing, size and font of the text data. Once the data is converted into the standard format, the data validation module 206 may validate the data based on a predictive AI model to generate validated data. In some embodiments, the predictive AI model may be created by the analysis module 208, as will be explained later in detail. In response to validating the data, errors may be identified in the test data. Further, in some embodiments, the data validation module 206 may validate the input data based on data governance rules and the business logic. Some exemplary business logic and data governance rules are illustrated through tables depicted in FIG. 3, FIG. 4, and FIG. 5.

Further, the data validation module 206 may evaluate the validated data based on a predefined criteria associated with the target application. In some embodiments, the data validation module 206 may compare the validated data with data expected at the target application. By way of an example, the validated data and the data associated with the target system may be compared using user-defined business logic and data governance rules. In some embodiments, the predefined criteria associated with the target application may include adequacy of the data. For example, during evaluating the data, the data validation module 206 may determine whether the validated data exceeds the data expected at the target application or whether the validated data falls short of the data expected at the target application. Additionally, in some embodiments, the data validation module 206 may alert a user when the validated data fails to satisfy the predefined criteria associated with the target application.

The analysis module 208 may create the predictive AI model. The analysis module 208 may receive validated data from the data validation module 206. In some embodiments, the analysis module 208 may create the predictive AI model based on the data received from the validation module 206, and errors identified during validating. In some embodiments, the analysis module 208 may create the predictive AI model based on diagnostic information for the errors encountered along with the data received from the validation module 206 and errors identified during validating.

The data received from the validation module 206, the errors encountered during validating, and diagnostic information for the errors encountered may act as collection of multiple data points which may then be utilized to develop the predictive AI model. In some embodiments, the predictive AI model may chart errors identified during the current validating cycle. As may be appreciated, the predictive AI model may be provided as training data to the AI module 210. The predictive AI model may further keep on updating itself with each new validating cycle that may be undertaken by the data validation module 206. Further, in some embodiments, the AI module 210 may provide training data to the data validation module 206. The predictive AI models prepared by the data validation module 206 may be stored in the analytics database 214. The analytics database 214 may further store other data developed and used by the analysis module 208.

In some embodiments, the analysis module 208 may receive test data, such that, errors in the test data are already identified by a user. The analysis module 208 may further identify errors in the test data using machine learning techniques. The analysis module 208 may then compare the errors identified by the machine learning techniques with the errors identified by the user. Based on the result of the comparing, the analysis module 208 may then train the predictive AI model to identify errors in input data.

Referring now to FIG. 3, a table 302 that includes exemplary business logic and data governance rules is illustrated, in accordance with an exemplary embodiment. In the table 302, business logic and data governance rules are illustrated under the "Mapping Rule" head. In some embodiments, the data validation module 206 may receive the data governance rules from the data governance rules database 212. The data governance rules database 212 may provide a standard set of rules that may be defined by an organization with respect to data quality. Referring now to FIG. 4, a table 402 that includes exemplary business logic and data governance rules is illustrated, in accordance with another exemplary embodiment. A column 410 in the table 402 includes exemplary business logic and data governance rules. Referring now to FIG. 5, a table 502 that includes exemplary business logic and data governance rules, in accordance with yet another exemplary embodiment. A column 510 in the table 502 includes exemplary business logic and data governance rules.

Figure 6:
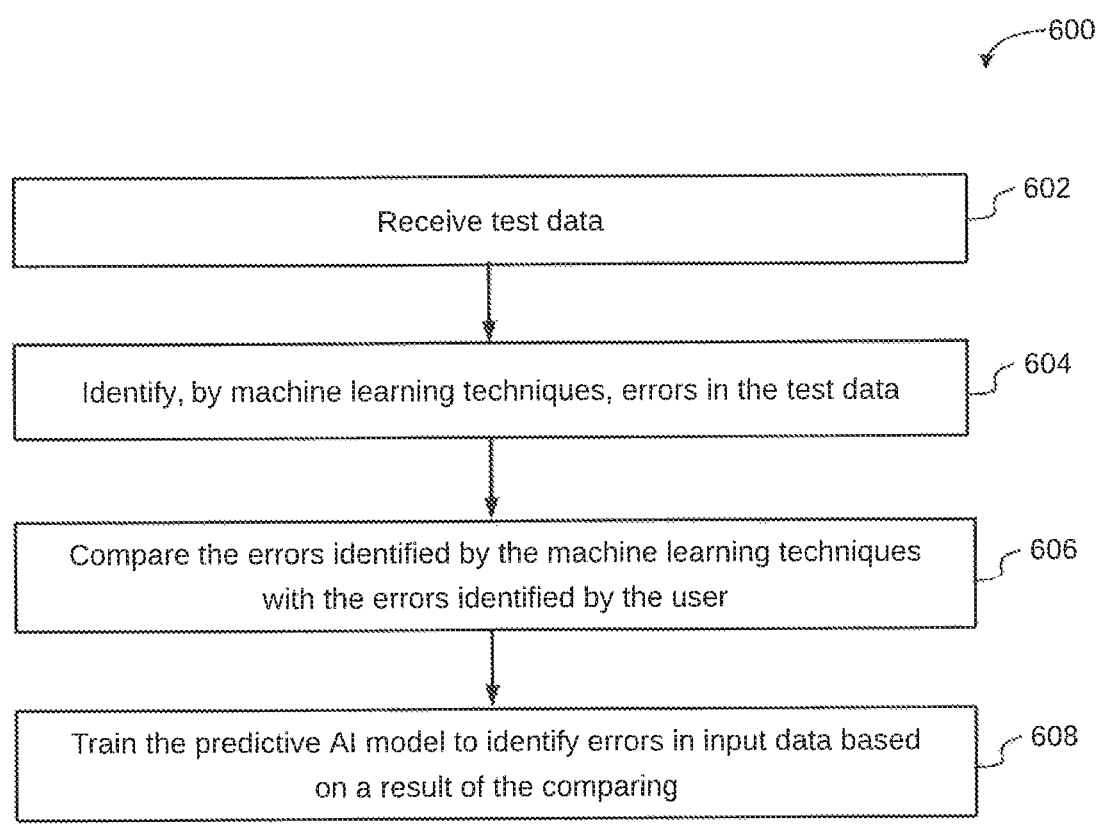
FIG. 6 illustrates a flowchart of a method for creating a predictive AI model, in accordance with an embodiment.

Referring now to FIG. 6, a flowchart 600 of a method for creating a predictive AI model is illustrated, in accordance with an embodiment. In some embodiments, the predictive AI model may be created by the analysis module 208 of the data validating device 102. At step 602, test data may be received. In some embodiments, errors in the test data may already be identified by a user when the test data is received. At step 604, errors in the test data may be identified by using machine learning techniques.

At step 606, the errors identified by the machine learning techniques may be compared with the errors identified by the user. In other words, at step 606, the errors identified by the machine learning techniques at step 604 may be compared with the errors identified by the user at step 602. At step 608, based on a result of the comparing, the predictive AI model may be trained to identify errors in input data. In some embodiments, the training of the predictive AI model may additionally be based on diagnostic information for the errors identified. The predictive AI model may be automatically updated.

Figure 7:
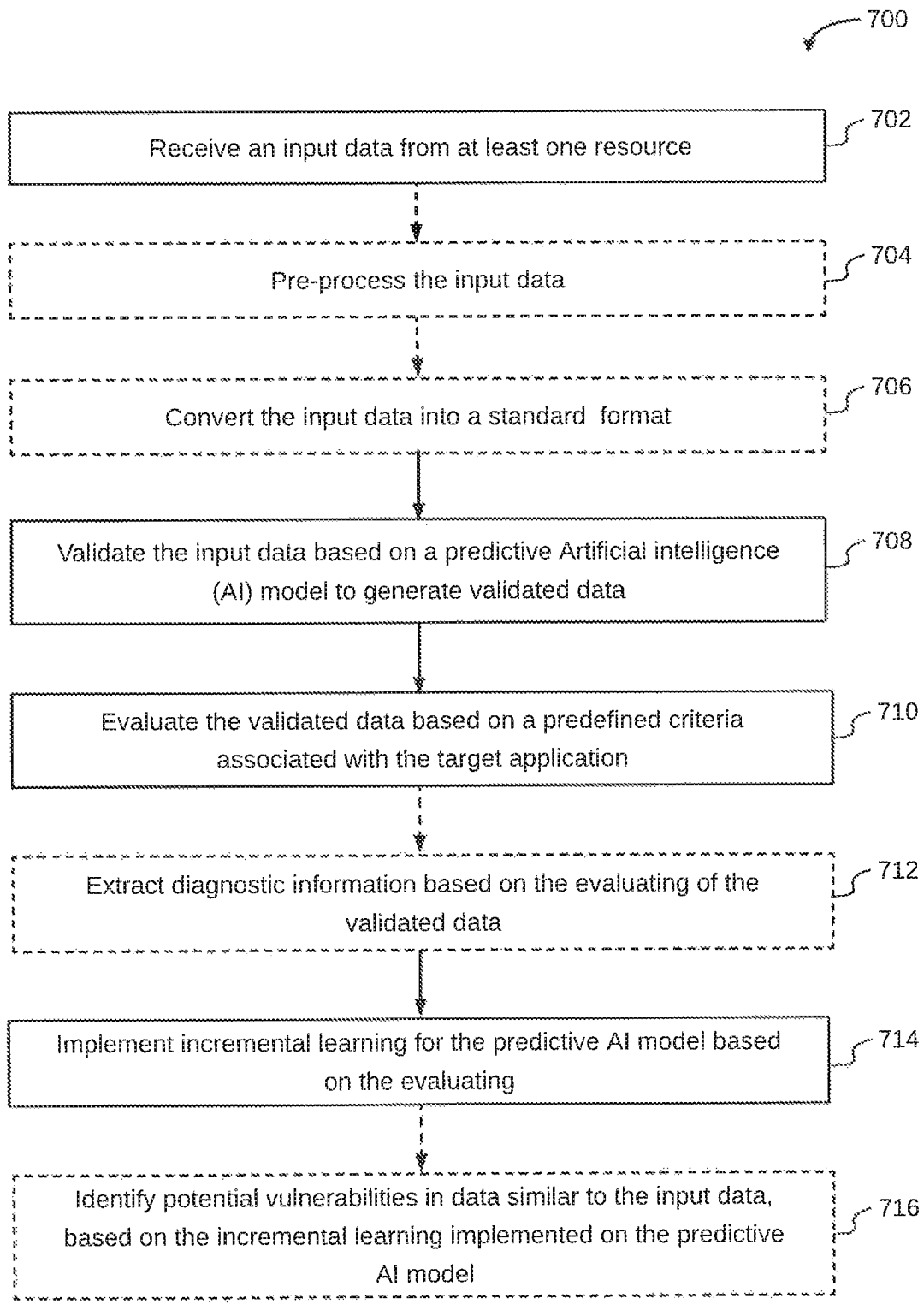
FIG. 7 illustrates a flowchart of a method for validating data for a target application, in accordance with an embodiment.

Referring now to FIG. 7, a flowchart 700 of a method for validating input data for a target application by a data validating device is illustrated, in accordance with an embodiment. In some embodiments, the validating of the input data may be performed by the data validation module 206 of the data validating device 102. At step 702, an input data from at least one resource may be received. In some embodiments, the input data may include structured data. In some embodiments, the input data may include unstructured data. In some embodiments, the structured data may include data extracted from an RDBMS, and the unstructured data may include data extracted from a website or data extracted from a word document. In some embodiments, the unstructured data may include machine generated data.

At step 704, the input data may be pre-processed. In some embodiments, the input data may be pre-processed by a data pre-processing module 204 of the data validating device 102. In some embodiments, the pre-processing of the input data may include one or more of removing incorrect data, updating incorrect data, removing incomplete data, updating incomplete data, removing improperly formatted data, updating improperly formatted data, and removing duplicated data from the input data. At step 706, the pre-processed data may be converted into a standard format. By way of an example, converting the data into a standard format may include adjusting spacing, size and font of the text data.

At step 708, the data may be validated based on a trained predictive AI model to generate validated data. The data may be validated by the data validation module 206 of the data validating device 102. In some embodiments, the data may be validated using data governance rules and the business logic. At step 710, the validated data may be evaluated. In some embodiments, the validated data may be evaluated based on a predefined criteria associated with the target application. The method of evaluating the data is further explained in detail in conjunction with FIG. 8.

At step 712, diagnostic information may be extracted based on the evaluating of the validated data. At step 714, based on the evaluating, incremental learning may be implemented for the predictive AI model. At step 716, potential vulnerabilities may be identified in data similar to the input data, based on the incremental learning implemented on the predictive AI model. By way of an example, potential vulnerabilities may be identified in test data associated with date information, as shown in FIG. 8.

Referring now to FIG. 8, an exemplary case for validating data for a target application is illustrated, in accordance with an exemplary embodiment. In this case, a system is frequently extracting invalid data associated with invalid date (null date) from a source (depicted by 802) while a valid date is required at target application. The data associated with date is validated by the data validating device 102 based on a predictive AI model. As a result of the data validating by the data validation devise 102, valid data associated with date (depicted by 804) is obtained.

Figure 9:
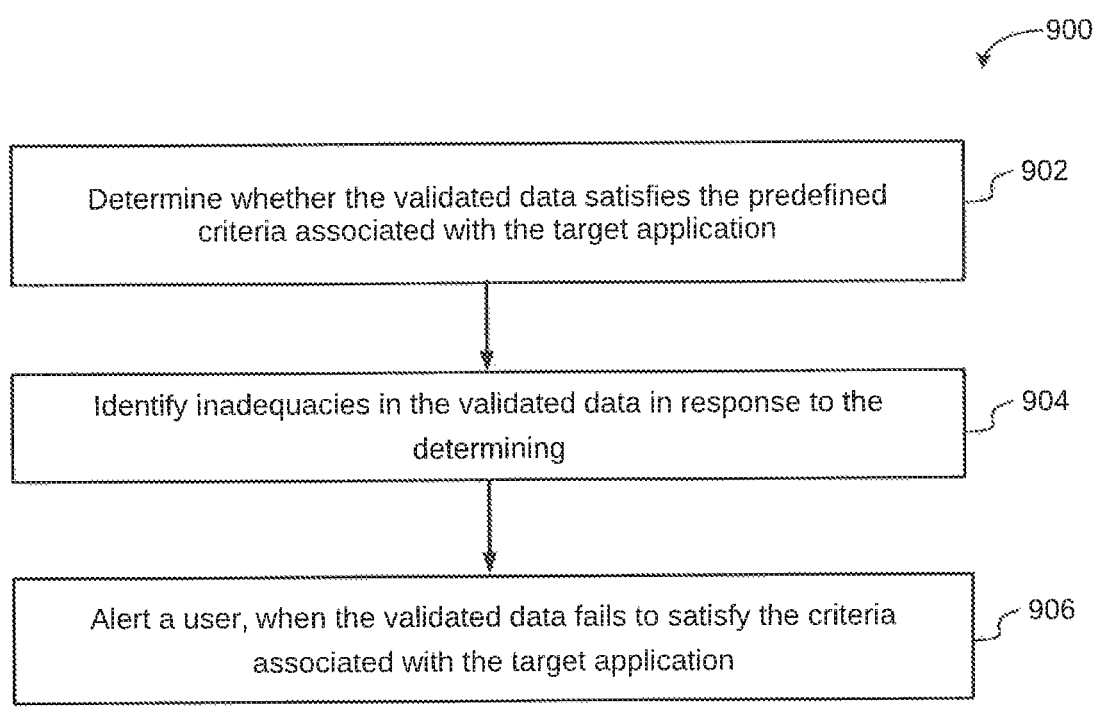
FIG. 9 illustrates a flowchart of a method for evaluating validated data based on a predefined criteria associated with the target application, in accordance with an embodiment.

Referring now to FIG. 9, a flowchart 900 of a method for evaluating is illustrated, in accordance with an embodiment. At step 902, it is determined whether the validated data satisfies a predefined criteria associated with the target application. In some embodiments, the validated data may be compared with data expected at the target application using user-defined business logic and data governance rules. In some embodiments, the predefined criteria associated with the target application may include adequacy of the data. At step 904, in response to the determining, inadequacies in the validated data may be identified. In some embodiments, it may be determined whether the validated data exceeds the data expected at the target application or whether the validated data falls short of the data expected at the target application. At step 906, a user may be alerted, when the validated data fails to satisfy the predefined criteria associated with the target application.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 10:
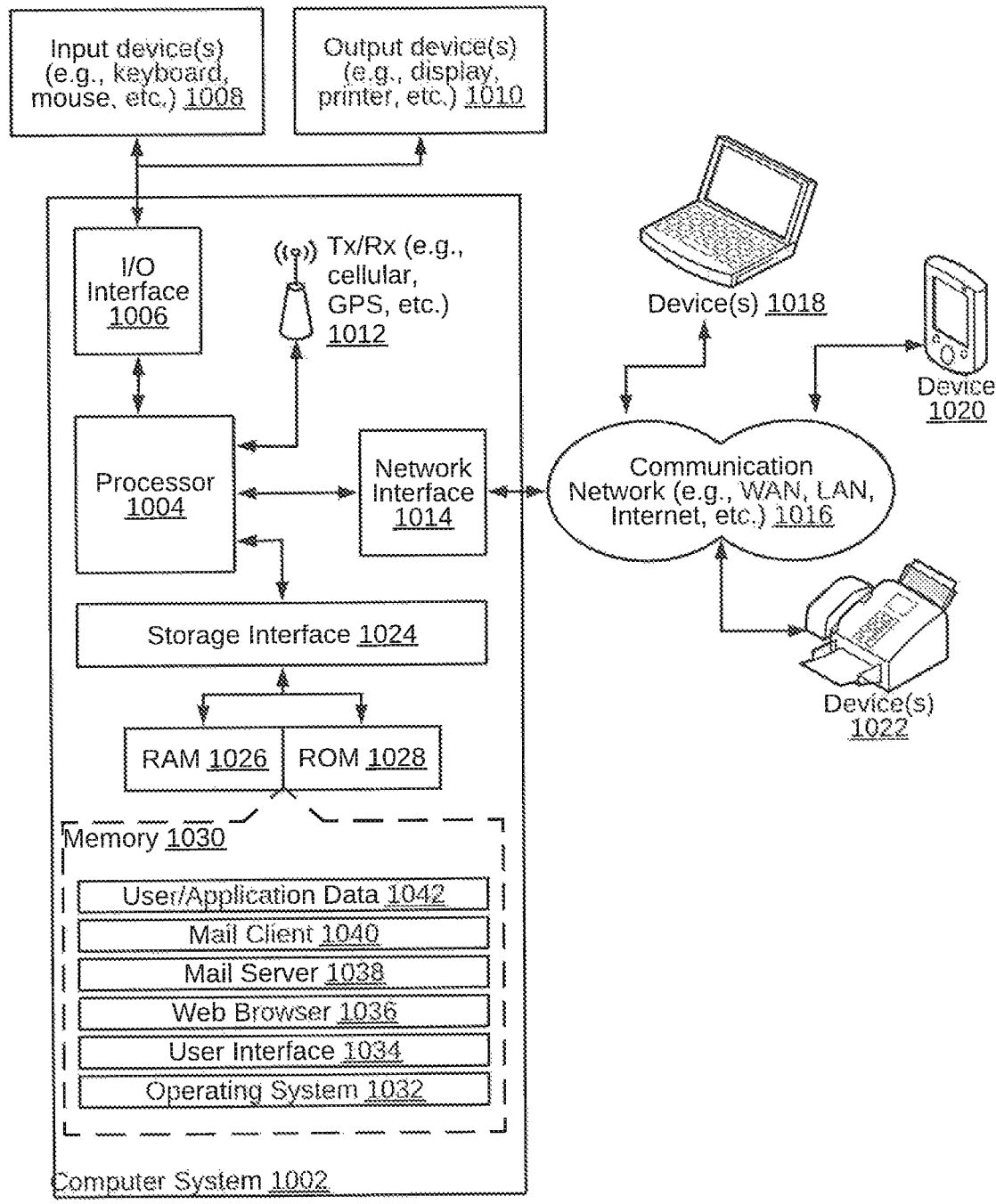
FIG. 10 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or database components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1002 may implement a mail server 1038 stored program component. Mail server 1038 may be an Internet mail server such as MICROSOFT EXCHANGE® mail server, or the like. Mail server 1038 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to validating data for using at target applications. The techniques employs AI technology which provide for reducing or eliminating test data management for various different types of data testing, as the AI technology is capable of configuring the test data. Further, the techniques provide for validating all types of data based on the business rules or transformation rules applied by businesses during processing the data between different source and target. By way of en example, the techniques provide for validating all types of data during processing the data between RDBMS database to NoSQL database or vice versa. Similarly, the techniques may be used to validate the data coming from different sources such as RDBMS, files, Pdf's, XML/JSON to any target. Further, the techniques work effectively for both cloud and on premises servers.

The specification has described method and system for validating data for using at a target application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of validating data for a target application, the method comprising:
   receiving, by a data validating device, an input data from at least one resource, wherein the input data comprises at least one of structured data and unstructured data, wherein the structured data comprises data extracted from a Relational Database Management System (RDBMS) and the unstructured data comprises one of data extracted from a website, machine generated data, or data extracted from a word document;
   validating, by the data validating device, the input data based on a predictive AI model to generate validated data;
   evaluating, by the data validating device, the validated data based on a predefined criteria associated with the target application, wherein the validated data is compared with data expected at the target application using user-defined business logic and data governance rules; and
   implementing, by the data validating device, incremental learning for the predictive AI model based on the evaluating.

2. The method of claim 1 further comprising converting the input data into a standard predefined format.

3. The method of claim 1 further comprising creating the predictive AI model, wherein the creating comprises:
   receiving test data, wherein errors in the test data are already identified by a user;
   identifying, by machine learning techniques, errors in the test data;
   comparing the errors identified by the machine learning techniques with the errors identified by the user; and
   training the predictive AI model to identify errors in input data based on a result of the comparing.

4. The method of claim 1, wherein evaluating further comprises:
   determining whether the validated data satisfies the predefined criteria associated with the target application; and
   identifying inadequacies in the validated data in response to the determining.

5. The method of claim 4, further comprising alerting a user, when the validated data fails to satisfy the predefined criteria associated with the target application.

6. The method of claim 1 further comprising pre-processing the input data, wherein pre-processing comprises at least one of removing incorrect data, updating incorrect data, removing incomplete data, updating incomplete data, removing improperly formatted data, updating improperly formatted data or removing duplicated data from the input data.

7. The method of claim 1 further comprising:
   extracting diagnostic information based on the evaluating of the validated data, wherein the incremental learning for the predictive AI model is implemented based on the diagnostic information.

8. The method of claim 1 further comprising identifying potential vulnerabilities in data similar to the input data, based on the incremental learning implemented on the predictive AI model.

9. A data validating device for validating data for using at a target application, the data validating device comprising:
   a processor; and
   a memory communicatively coupled to the processor, wherein the memory stores processor instructions, which, on execution, causes the processor to:
      receive an input data from at least one resource, wherein the input data comprises at least one of structured data and unstructured data, wherein the structured data comprises data extracted from a Relational Database Management System (RDBMS) and the unstructured data comprises one of data extracted from a website, machine generated data, or data extracted from a word document;

validate the input data based on a predictive AI model to generate validated data;

evaluate the validated data based on a predefined criteria associated with the target application, wherein the validated data is compared with data expected at the target application using user-defined business logic and data governance rules; and implement incremental learning for the predictive AI model based on the evaluating.

10. The data validating device of claim 9, wherein the processor instructions further cause the processor to create the predictive AI model, wherein the creating comprises:

receiving test data, wherein errors in the test data are already identified by a user;

identifying, by machine learning techniques, errors in the test data;

comparing the errors identified by the machine learning techniques with the errors identified by the user; and training the predictive AI model to identify errors in input data based on a result of the comparing.

11. The data validating device of claim 9, wherein evaluating further comprises:

determining whether the validated data satisfies the predefined criteria associated with the target application;

identifying inadequacies in the validated data in response to the determining; and alerting a user, when the validated data fails to satisfy the predefined criteria associated with the target application.

12. The data validating device of claim 9, wherein the processor instructions further cause the processor to:

convert the input data into a standard format; and pre-process the input data, wherein pre-processing comprises at least one of removing incorrect data, updating incorrect data, removing incomplete data, updating incomplete data, removing improperly formatted data, updating improperly formatted data or removing duplicated data from the input data.

13. The data validating device of claim 9, wherein the processor instructions further cause the processor to:

extract diagnostic information based on the evaluating of the validated data, wherein the incremental learning for the predictive AI model is implemented based on the diagnostic information.

14. The data validating device of claim 9, wherein the processor instructions further cause the processor to:

identify potential vulnerabilities in data similar to the input data, based on the incremental learning implemented on the predictive AI model.

15. A non-transitory computer-readable storage medium having stored thereon, a set of computer-executable instructions causing a computer comprising one or more processors to perform steps comprising:

receiving an input data from at least one resource, wherein the input data comprises at least one of structured data and unstructured data, wherein the structured data comprises data extracted from a Relational Database Management System (RDBMS) and the unstructured data comprises one of data extracted from a website, machine generated data, or data extracted from a word document;

validating the input data based on a predictive AI model to generate validated data;

evaluating the validated data based on a predefined criteria associated with the target application, wherein the validated data is compared with data expected at the target application using user-defined business logic and data governance rules; and implementing incremental learning for the predictive AI model based on the evaluating.

* * * * *